US012564476B2

(12) United States Patent
Vuillemot

(10) Patent No.: US 12,564,476 B2
(45) Date of Patent: Mar. 3, 2026

(54) DEVICE AND KIT FOR INJECTION BONDING MULTI-TOOTH DENTAL RESTORATION IN A SINGLE TREATMENT

(71) Applicant: William C. Vuillemot, Dewitt, MI (US)

(72) Inventor: William C. Vuillemot, Dewitt, MI (US)

(73) Assignee: William C. Vuillemot, Dewitt, MI (US)

( * ) Notice: Subject to any disclaimer, the term of this patent is extended or adjusted under 35 U.S.C. 154(b) by 96 days.

(21) Appl. No.: 18/758,811

(22) Filed: Jun. 28, 2024

(65) Prior Publication Data

US 2024/0358474 A1     Oct. 31, 2024

Related U.S. Application Data

(60) Provisional application No. 63/499,227, filed on Apr. 29, 2023.

(51) Int. Cl.
*A61C 5/30*          (2017.01)
(52) U.S. Cl.
CPC ..................................... *A61C 5/30* (2017.02)
(58) Field of Classification Search
CPC ........... A61C 5/30; A61C 5/20; A61C 13/081; A61C 13/09
See application file for complete search history.

(56) References Cited

U.S. PATENT DOCUMENTS

| | | | | |
|---|---|---|---|---|
| 11,311,358 B1 * | 4/2022 | Vuillemot | ............ | A61C 13/081 |
| 2006/0115792 A1 * | 6/2006 | Vuillemot | ............. | A61K 6/887 |
| | | | | 433/34 |
| 2011/0212420 A1 * | 9/2011 | Vuillemot | ............ | A61C 13/206 |
| | | | | 433/215 |

(Continued)

FOREIGN PATENT DOCUMENTS

| | | | | | |
|---|---|---|---|---|---|
| CN | 107126272 A | * | 9/2017 | ............... | A61C 5/20 |
| WO | WO-03059184 A2 | * | 7/2003 | ........... | B29C 64/153 |

*Primary Examiner* — Amy R Weisberg
(74) *Attorney, Agent, or Firm* — Harness, Dickey & Pierce, P.L.C.

(57)          ABSTRACT

Methods and kits of materials and supplies for restoring teeth by an injection molding process and/or mold overlays in situ in a patient's mouth so as to correct the imperfect teeth of the patient's dentition. The imperfect teeth are corrected by applying restoration materials using a mold of a corrected model of the patients dentition placed over the imperfect teeth. Adjacent teeth may be covered with a polymer release material prior to injection molding of teeth to be corrected, such that the teeth to be corrected have at least one tooth between them draped with the polymer release material to provide a space adjacent to each of the corrected teeth. The corrected teeth are then covered with the polymer release material in a second round of treatment and restoration material is applied to one or more previously covered teeth to provide a first layer which simulates the dentin layer of teeth. Thereafter a simulated enamel layer is applied over the dentin layer using one or more alternating molds and yet another simulated incisal layer is applied over the enamel layer using one or more alternating molds employing the techniques described.

17 Claims, 10 Drawing Sheets

(56)                    References Cited

U.S. PATENT DOCUMENTS

| | | | |
|---|---|---|---|
| 2013/0130202 A1* | 5/2013 | Vuillemot | A61C 5/20 |
| | | | 433/213 |
| 2015/0140517 A1* | 5/2015 | Vuillemot | A61C 13/0004 |
| | | | 433/226 |
| 2016/0100917 A1* | 4/2016 | Howe | A61C 13/0004 |
| | | | 264/16 |
| 2020/0397541 A1* | 12/2020 | Vuillemot | B33Y 80/00 |
| 2024/0341929 A1* | 10/2024 | Hansen | A61C 13/0001 |

* cited by examiner

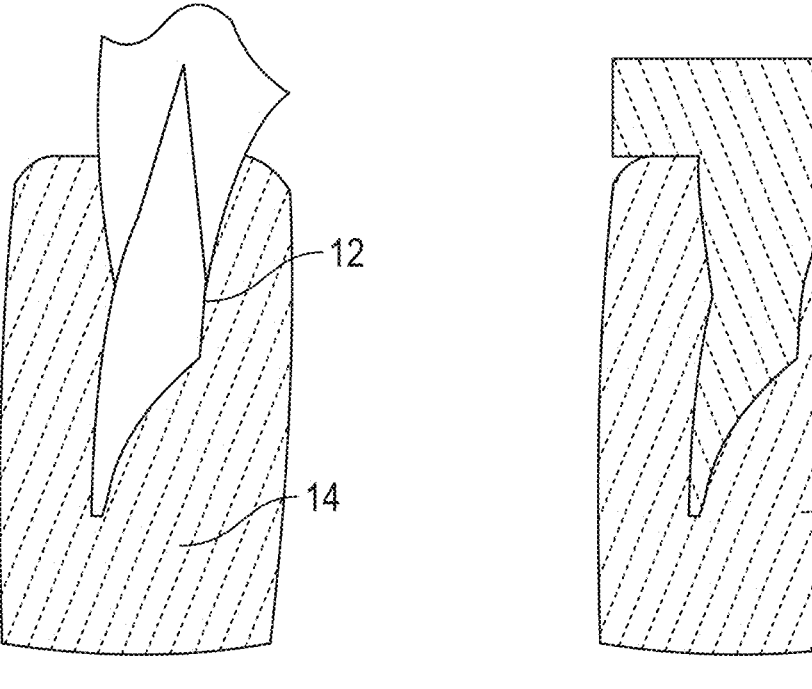
FIG. 3                    FIG. 4
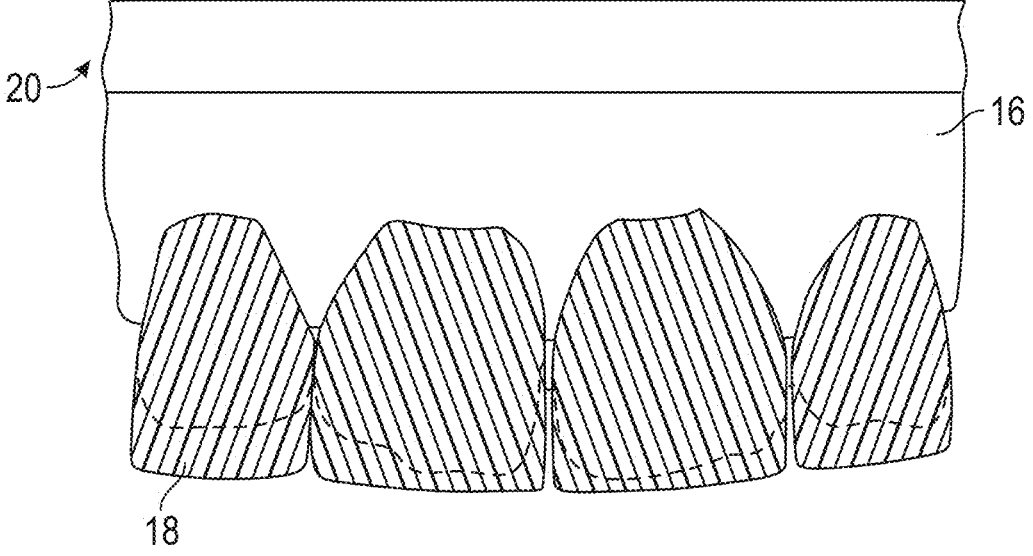
FIG. 5

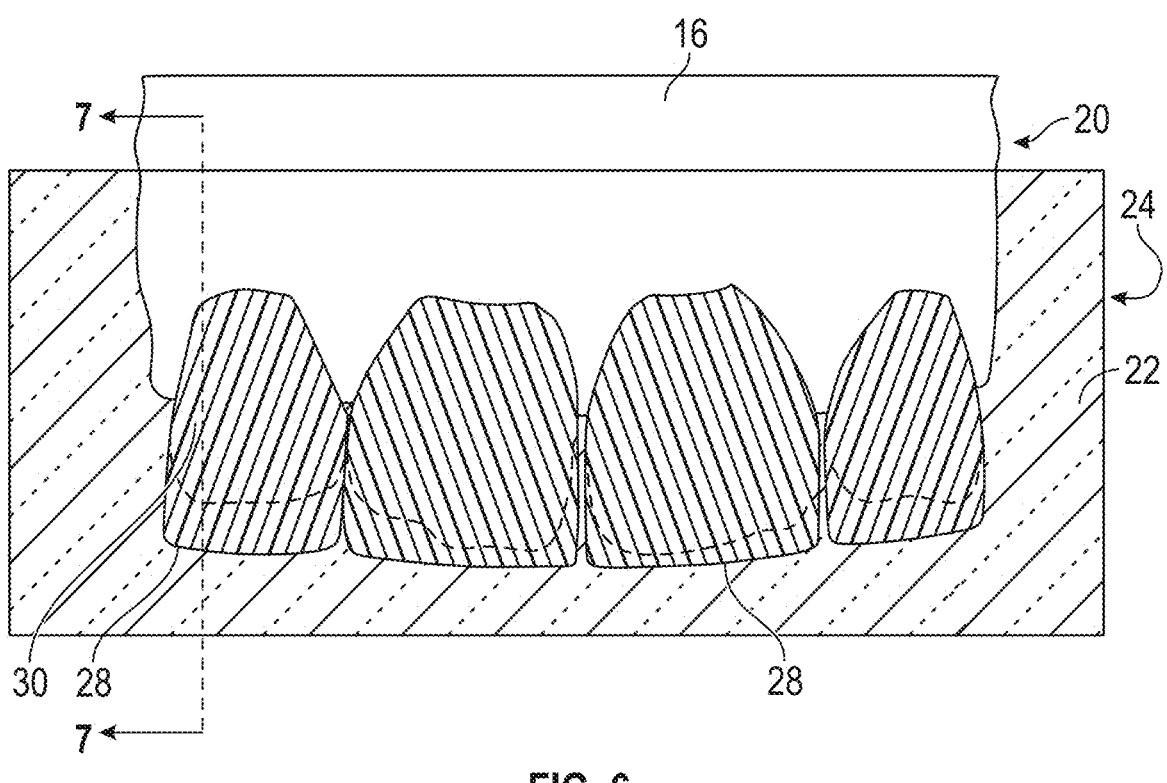
FIG. 6
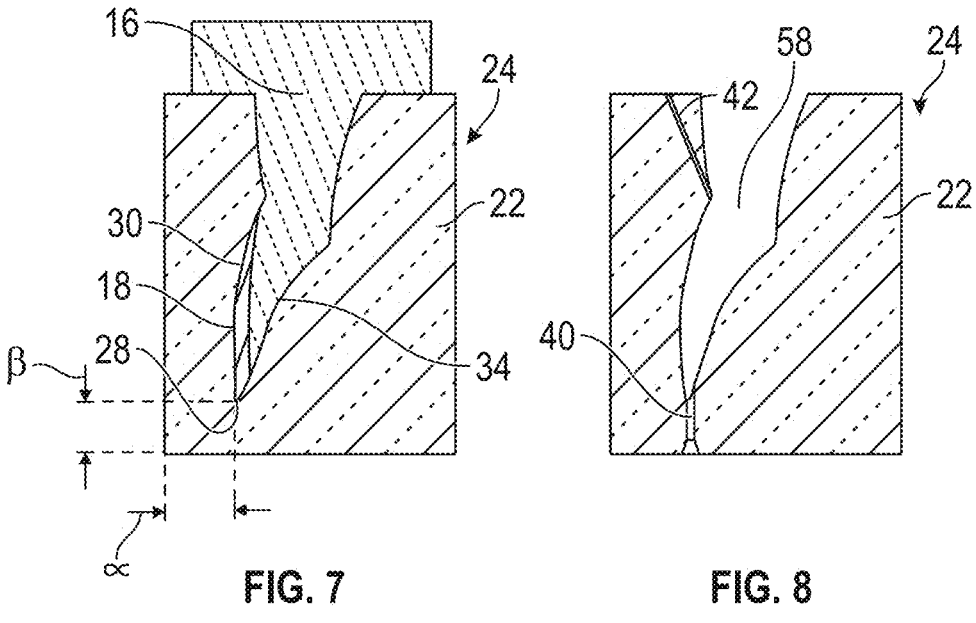
FIG. 7                    FIG. 8

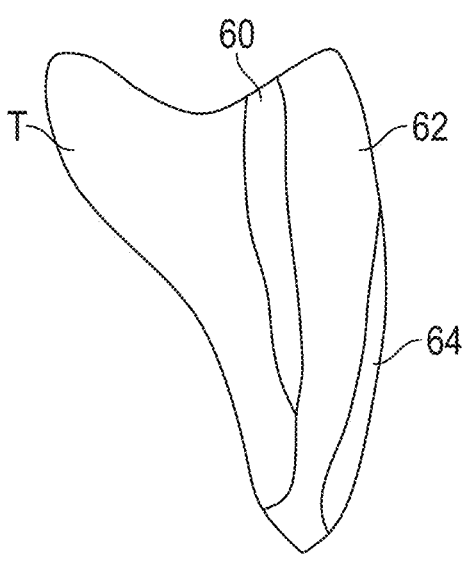
FIG. 19
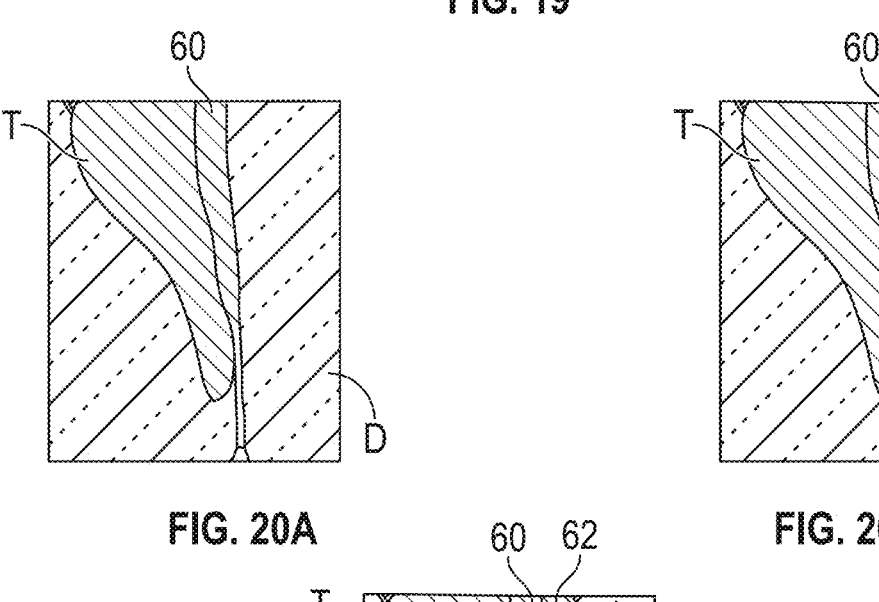
FIG. 20A
FIG. 20B
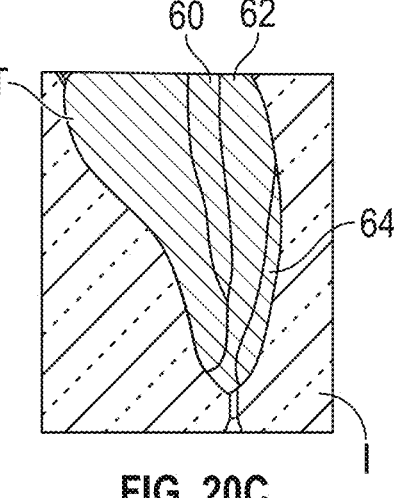
FIG. 20C

DEVICE AND KIT FOR INJECTION BONDING MULTI-TOOTH DENTAL RESTORATION IN A SINGLE TREATMENT

CROSS-REFERENCE TO RELATED APPLICATIONS

This application claims the benefit of U.S. Provisional Application No. 63/499,227, filed on Apr. 29, 2023. The entire disclosure of the above application is incorporated herein by reference.

FIELD

The present disclosure relates to a Multi-Layer Multi-Mold Restoration Method, Device and Kit.

BACKGROUND

The present invention relates generally to dental prosthesis, and more particularly to methods of forming dental prosthesis. Specifically, the present invention relates to methods of forming dental prosthesis in situ in a patients mouth by injection molding using multiple molds formed from corrected patient models to apply multiple layers of restorative material to teeth.

DESCRIPTION OF PROBLEM OF RELATED ART

Millions of people are unhappy with the appearance of their smiles. However, many will not proceed with corrective or improvement treatments due to the cost involved, the time requirements to complete treatment and/or fear of the treatment process.

Regarding cost, for dentists to perform cosmetic smile enhancement (CSE) on a patient's upper front "smiling teeth" (usually a total of 8 teeth, numbered teeth 4-12, or from the first upper right bicuspid to the first upper left bicuspid) the cost might range from $1000-$3000 used per tooth for lab fabricated porcelain crowns and/or veneers or more depending on location of the dental practice and the experience, skill and reputation of the dental team. A CSE case fee of many thousands of dollars creates an insurmountable cost barrier to treatment for most of the population who might otherwise have a longstanding yearning or desire for smile improvement treatment.

Regarding time, porcelain work usually involves taking of a final impression for model/die work so that a lab tech may fabricate crowns (usually requiring 2-4 weeks of lab time), during which the patient must wear plastic temporary crowns/veneers over the prepared teeth. Temporaries are often uncomfortable and fragile, and prone to dislodging at inopportune times, so the time factor for porcelain work remains a major turn-off or impediment to treatment for many prospective patients.

Regarding fear, preparation for porcelain crowns and veneers usually requires some amount of preparation work, including drilling or grinding down of the patient's existing tooth structure, so that when the porcelain fittings are placed on the teeth, they will blend into the existing structure and volume of the dentition. The drilling, or grinding down of the teeth is a "deal breaker" for many patients who would otherwise love to have an improved smile. Patients who have seen drilled down teeth refer to them as "pegs" and are terrified of having such work done on their own teeth. Further, while the initial end result can be beautiful, over time restorations tend to become abraded or worn away, and the color characteristics may change or be degraded. If this were to occur, the only known remedy would be to completely remove and then replace the entire porcelain restoration, at great cost and inconvenience to the patient.

An alternative to costly, fearful, and time-consuming porcelain work is dental composite bonding. Bonding can often be placed in one visit and in most cases little drilling or grinding is needed, so pain is not an issue. Usually, bonding cases may be completed without the need for numbing or anesthetic. Because bonding may be set or cured instantly, and temporaries are not necessary, the dentist may offer the service at a lower price point than porcelain, such that bonding may meet and address various objections to treatment such as cost, time, and fear, However, cosmetic bonding treatments tend to a short term solution since bonding only lasts a limited amount of time and often requires follow up visits to repair or replace the bonding.

Hereto for the current inventor has devised other CSE methods based on "injection bonding" for improving the physical appearance of patients' teeth. It has been found however, that there tends to be a waste of treatment materials with injection bonding. Further, overall tooth coloration does not fully simulate the natural appearance of well-maintained teeth. For example, U.S. Pat. No. 7,217,131 dated May 15, 2007; U.S. Pat. No. 8,366,455 dated Feb. 5, 2013, and U.S. Pat. No. 8,753,114 dated Jun. 17, 2014 (all of which are hereby expressly incorporated by reference) generally relate to the concept of utilizing mold shells having injection ports for applying restoration materials to teeth in a concise systematic manner. While the methods described therein have been found to be effective overall, the present inventor has found that restorations carried out utilizing the disclosed techniques tend to be fairly monochromatic and lack an overall aesthetic appearance more closely reflecting the natural appearance of teeth.

While the prior inventions in this field offered certain improvements, the present invention offers methods, devices leading to a more realistic natural appearing end result, and kits for both cosmetic and functional restoration of the entire tooth dentition. The device allows the dentist to mimic three natural layers of human dentition namely (1) a dentin layer; (2) an enamel layer; and (3) an incisal/facial layer.

SUMMARY

Use of the present invention allows the unique possibility of physically recreating three (3) layers of human teeth namely dentin, enamel and incisal layers as a restorative process in-situ, for improved visual and aesthetic results while emulating the strength and durability of natural tooth structure.

Presented is a device/kit which allows the dentist to repair teeth by systematically building up the tooth in layers emulating natural tooth structure. In this regard (1) first the dentin layer is restored using one or more custom fabricated shells for placement of dentin restorative material on either all of the teeth to be treated at once employing a single shell or in certain instances where crowding or rotation are an issue using two or more shells employing an alternative tooth approach. Then (2) the enamel layer is restored using custom fabricated shells for placement of the enamel layer of tooth structure over the dentin layer usually using an alternative tooth restoration approach so as to not bond adjacent teeth together. Finally (3) applying the incisal/facial layer of tooth structure over at least a portion of the enamel layer using one or more custom fabricated shells, after optional placement of any desired custom tints and/or dyes over the previously placed enamel layer. The incisal/facial layer may be placed on all teeth at once if the risk of adjacent tooth bonding is low, or the alternative tooth method may be utilized if the risk of inadvertent adjacent bonding is higher.

An object of this invention is improving a patients current dental condition or acquired bite. The current condition, or wants or needs, described by the patient are referred to as the chief complaint. Current condition, or acquired bite may present as one or more of the following: worn tooth surfaces (when areas which are ideally or normally sharp and pointed are flattened or worn down); fractured teeth; severely decayed teeth; discolored or stained teeth; teeth which are too small for the arches and therefore have excess space between them; and mal-positioned or mal-aligned teeth.

Therefore, the desired changes, or restoration of the teeth can be as follows: re-addition of worn surfaces (which may involve many teeth, and allows the option of "opening the bite"); repair and restoration of fractured teeth; repair and restoration of decayed teeth; covering up of unsightly stains or discolorations; widening of small teeth to close spaces or gaps; and additive or subtractive coronoplasty to improve symmetry and alignment (masking of malposed teeth-giving impression of "instant orthodontics").

The custom layering technique offered under the present invention is compelling and desirable because the color optics and translucency displayed in natural human dentition may be simulated more accurately by a dentist chairside/clinically in one treatment visit, by using a custom kit created specifically for each patient.

Still other objectives and advantages offered according to the teachings of the present invention will become apparent from the below description when taken with the supportive drawings.

DRAWINGS

The drawings described herein are for illustrative purposes only of selected embodiments and not all possible implementations, and are not intended to limit the scope of the present disclosure.

BRIEF DESCRIPTION OF THE DRAWINGS

Corresponding reference numerals indicate corresponding parts throughout the several views of the drawings.

FIG. 3 shows a cross-section of a tooth 12 taken along line 3-3 of FIG. 2.

FIG. 4 shows a plaster model 16 cast from the impression 14 taken of the current condition of the patient's teeth.

FIG. 5 shows a waxed-up model 20 which is constructed from the plaster model 16 having desired changes made with the addition of dental wax. 18.

FIG. 6 shows clear impression material 22 which remains over the waxed-up model 20 after removal of the impression tray.

FIG. 7 is a cross-section of the waxed-up model 20 taken along line 7-7 of FIG. 6 showing the mold 24 having desired changes over the plaster model 16 with the dental wax 18 corrections.

FIG. 8 is a cross-section of the mold 24 taken along line 7-7 of FIG. 6 after removal of the clear impression material 22 from the waxed-up plaster model.

FIG. 19 shows a cross-sectional side view of a tooth depicting a dentin layer, an enamel layer and an incisal layer.

FIGS. 20A-20C show a cross-section of the progressive mold shapes for applying a dentin layer, an enamel layer and an incisal layer to a patients teeth.

DETAILED DESCRIPTION OF THE INVENTION

Figure 1:
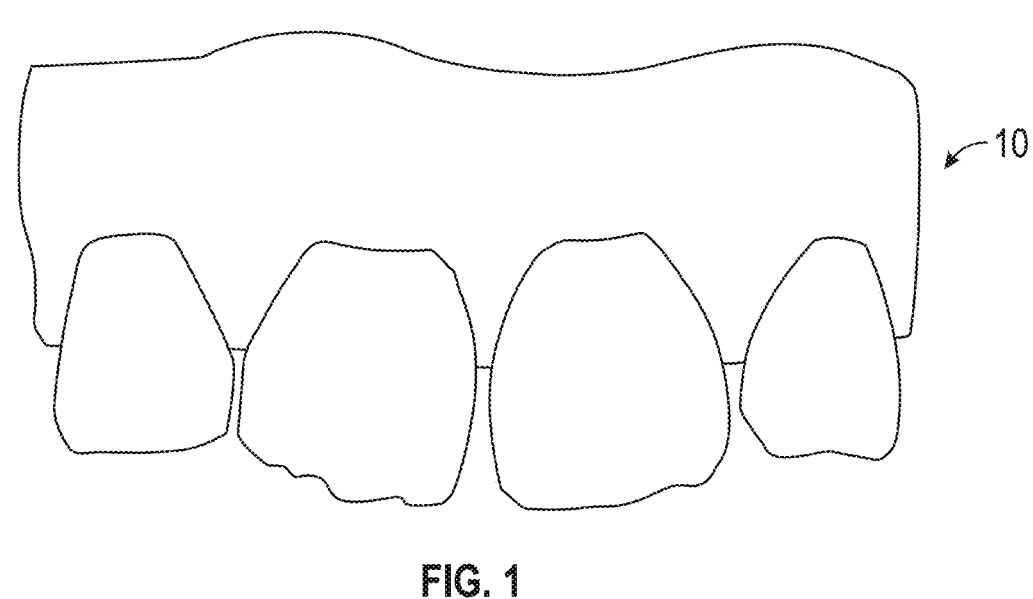
FIG. 1 shows a patient's teeth 10 to be restored.
Figure 2:
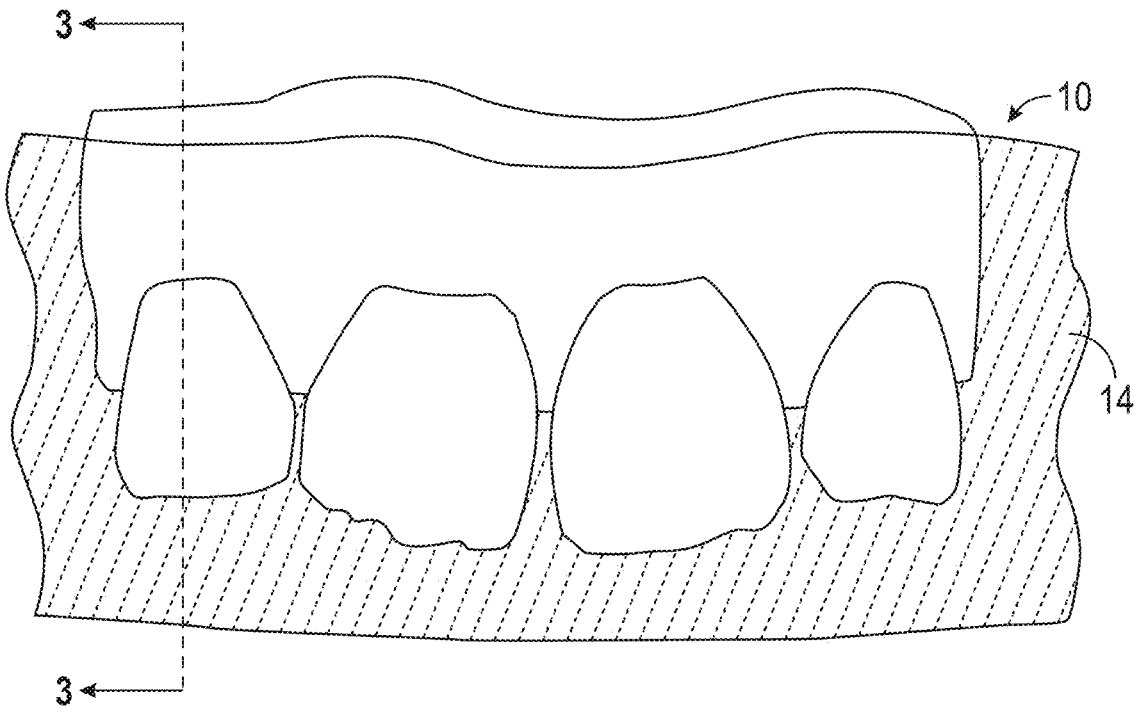
FIG. 2 shows an impression 14 being taken of the current condition of the patient's teeth 10 to be restored.

The present invention provides a multi-layer multi-mold method for restoring teeth in need of restoration in a patient. The method comprises the steps of: (a) preparing selected teeth to be restored; (b) optionally covering teeth which are not to be restored in a first pass with a polymer release material; (c) fitting a clear thermoplastic mold over the teeth to be restored and the teeth not to be restored, which mold provides a closed space to be filled between the teeth to be restored and the mold which defines a first shape of partially restored teeth, wherein the mold has an inlet port for injection of a fluid restoration composition and an outlet port for removing any excess air and/or excess restoration composition; (d) injection molding a first restoration composition into the mold to fill a space in the mold with the covered teeth and the teeth to be restored to apply a first layer of restoration material; (e) optionally, if necessary curing the fluid restoration composition onto the teeth to be restored to provide a simulated dentin layer; (f) repeating steps (a)-(e) to provide a simulated enamel layer over at least a portion of the dentin layer; and (g) repeating steps (a)-(e) to apply incisal layer over at least a portion of the enamel layer to provide an incisal layer; and optionally polishing the partially restored teeth to complete the restoration.

In certain instances, such as the inlet port may omitted, and the restorative material placed directly into the shell mold and applied over the patients teeth. However, even in this embodiment vent holes are preferably included.

In further embodiments of the method, the polymer release material is polytetrafluoroethylene. In still further embodiments the polymer release material is in tape which is preferably about 1.5 cm wide and about 0.2 mm thick. In still further embodiments the clear thermoplastic molds are derived from prepared models of the teeth as they will be restored in the patient, and wherein inlet and outlet ports are formed into the mold. In further embodiments a dental cast is prepared from an impression of the teeth to be restored, then a dental stone model is prepared, and then wax models are formed and modified to simulate the dentin, enamel and incisal teeth layers as they will be restored. In further embodiments the restoration compositions are cured with light. In still further embodiments the restoration compositions are cured with ultraviolet light of about 465 nm to about 480 nm. The activating ultraviolet light of 465 nm to 480 nm is directed throughout the clear, light-transmissive molds for the purpose of hardening or curing the light-sensitive restoration compositions for the dental restoration. In further embodiments of the method, the dental restoration compositions are particle filled and pigmented poly(acrylic acid) polymer containing a curing agent activated by light.

In further embodiments of the method, teeth being restored are etched with an acid and then coated with a primer and bonding agent for bonding the dental restoration composition to the prepared teeth. In preferred embodiments the bonding agent comprises methacrylate ester monomers and the primer comprises alkyl dimethacrylate resins.

Example embodiments will now be described more fully with reference to the accompanying drawings.

Example embodiments are provided to more fully convey the scope of the invention to those of ordinary skill in the art. Numerous specific details are set forth such as examples of specific compositions, components, devices, and methods, to provide a thorough understanding of embodiments of the present disclosure. It will be apparent to those skilled in the art that certain specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The term "polymer release material" as used herein refers to a material such as a tape for wrapping or draping teeth not being treated in the specific instance or which have already been treated. The material acts as a parting agent, preventing the injection molded composite from sticking to a surface covered with the material. The term refers to a material including, but not limited to tape such as a pipe thread tape including polytetrafluoroethylene (PTFE) pipe thread tapes. One example of the polymer release material is TEFLON® pipe thread tape (DuPont, Wilmington, Del.).

The term "model" refers to a dental cast commonly referred to as a plaster model or a dental stone model which reflects the current condition of the patient's teeth. Preferably, the model comprises a gypsum die stone. More preferably, the gypsum die stone further comprises a resin including but not limited to acrylic, polyester, urethane or epoxy resins. Most preferably, the gypsum die stone material for the dental model is AMERICAN DIEROCK® resin die stone marketed by American Diversified Dental Systems of Anaheim, Calif. Alternatively, "model" can be in the form of a printed 3D model generated from data acquired from photos and/or scans of the patients teeth and simulations created via computer.

The term "modeling material" as used herein refers to any material used for the modification of dental models such as dental waxes. The terms "restoration composition" or "fluid polymer composition" as used herein refers to a flowable material which may be cured to harden the material, including dental composite resins. The fluid polymer composition is preferably curable by exposure to light, however chemical curing is within the scope of the invention. Most preferably, the composition is cured with ultraviolet light of about 465 nanometers (nm) to about 480 nm. One example of a composite resin is HELIOMOLAR® Flow composite (Ivoclar Vivadent, Amherst, N.Y.) which is a monomer matrix of 2,2-bis-4-(3-methacryloxy-2-hydrox-ypropoxy)-phenylpropane (Bis-GMA), urethane dimethacrylate and decandiol dimethacrylate (40.5 wt %) with highly dispersed silicon dioxide, ytterbiumtrifluoride and copolymer (59 wt %) fillers and additionally catalysts, stabilizers and pigments (0.5 wt %).

The present invention further provides a kit which provides all necessary materials and supplies in one package. The package can be moved from operatory to operatory as needed. The kit may also contains all necessary educational materials, such as audio, video and/or written instructions to carry out a prescribed treatment plan.

The method for multi-layered restoration will be described both in terms of both the lab fabrication of the various kit components, and from the standpoint of the restorative multi-layered dental procedures for a more complete understanding of the scope of the present invention. FIGS. 1 through 20C may be referred to for a more thorough understanding of the invention.

Pre-Treatment Steps

Before any restoration work is undertaken, a treatment plan should be developed by the dental professional on a case by case basis. This initial step involves the dental professional doing what is necessary to ensure the lab work needed is properly executed.

Thus, impressions and photos of the patient are prepared for use by the lab from the treating dentist along with any specific treatment requirements such as color, shape, outline and tooth length, for example. A copy of the patient's beginning or current condition is always preserved. Duplicate copies of the current/initial condition are made for fabrication of the models needed to form the molds necessary to apply the restorative "layers" (dentin, enamel and incisal/facial).

Initial impressions of the patient's teeth are obtained either by digital scanning or traditional putty molds (which will be poured up in modeling stone). The initial models will be duplicated for manipulations, but a copy of the original condition will always be maintained in the dental records.

Once the restorations have been "mocked up" by the dentist, and reviewed and approved by the patient, the dentist orders the work to proceed for developing the restoration "kit" from laboratory.

Lab Procedures

Before any treatment shells are formed if the teeth to be treated are rotated or crowded, the dental professional may order the lab to develop a preparation guide, to allow the dentist to achieve a neutral "starting point" for addition of the desired layers. The prep guide is created by the lab as follows: The initial model is placed in a vacuum form device and a heated 0.040 or 0.060 clear plastic sheet is molded over the initial tooth model using vacuum force. Once cooled and trimmed, the stone model teeth are ground back through the clear plastic guide until all protruding edges are shaped to achieve an even arch form. The preparation guide is then removed and included in the kit.

After the optional preparation guide is generated, the next step for the lab is fabrication of the dentin layer bonding shell(s) A model 16, commonly referred to as a dental stone model, of the patient's teeth 10, exhibiting the current condition is developed from the hardened putty molds provided to the lab by the dentist as shown in the sequence of FIGS. 1-4. The model is an accurate reproduction of the patient's acquired bite, and demonstrates the chief complaint, which can then be studied carefully.

After forming the initial stone model, the desired changes are made to the stone model 16 by addition of dental wax 18 as shown in FIG. 5. The dental wax 18 is heated till flowable, and then applied to the model 16, with appropriate waxing instruments. When the dental wax 18 has cooled, it can be shaped with carving instruments, and optionally polished. As will be described in greater detail below, dental wax modeling under the present invention differs from the prior art in that a wax impression is formed for each stage of the treatment process, e.g. the dentin layer, the enamel layer and the incisal layer. Care must be taken to ensure that the desired changes are performed on the tooth models in an exacting manner. The transfer technique is highly accurate, and any changes represented by the wax 18 contours, on the plaster model 16, will be reproduced on the teeth in the patient's mouth.

Optionally, instead of forming stone tooth models 3D models may be generated using known scanning technologies and 3D printers.

FIG. 6 shows an example of clear impression material which remains over a waxed-up plaster model after removal of the impression tray which is the mold having the desired changes to the patient's teeth.

The hard, clear impression tray is carefully flexed, and removed from the mold 24. The mold 24 will remain firmly attached to the waxed-up stone or 3D printed model 20. Using a sharp lab knife, for example an exacto knife, the excess clear impression material 22 is cut away from the waxed-up model 20 at the height of contour (gingival crest) or the buccal mucosa, and lingual and palatal tissues. Allowing the molded edges to extend beyond the teeth and rest on the gingival tissues is desirable and necessary, both for stability of the mold 24 during placement, and the accuracy of the restorative changes near the gum-line.

Using fingers and thumbs, the edges of the clear mold 24 are carefully peeled from the waxed-up stone model 20. If caution is exercised, the clear mold 24 can be dislodged with no damage to either the wax 18 or mold 24. The dentist now possesses a clear, see through mold 24, which is a negative, or impression mold, of the idealized waxed-up model 20. When this mold is placed over the patient's teeth 10, it will snap into place with precision, and fit securely. The patient's teeth 10 will fill the space 58 in the mold 24 exactly, except where wax 18 was placed on the stone or 3D model 16. Where wax 18 was placed, a space 58 will exist, either between, over, or around a tooth 12, defined by the inner contours of the mold 24. It is into this space 58 the restorative material, specifically the composite resin 54, will be injected to make the desired changes to the teeth 10. FIG. 8 shows an example of a mold which has been cut to ensure proper thickness on the buccal and incisal aspects of the teeth showing the ingress holes and vent holes.

Figure 9:
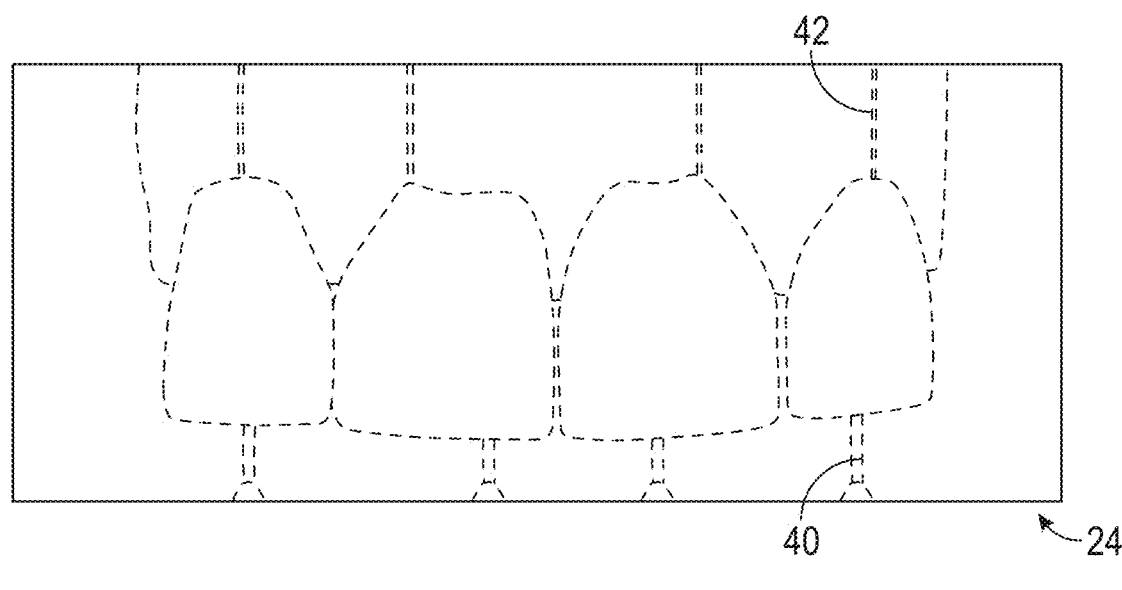
FIG. 9 is the mold 24 having desired changes after removal from the waxed-up model and cutting of the ingress holes 40 and vent holes 42 adjacent to each of the teeth.

Ingress hole 40 must be placed in the mold 24 to allow access for the composite 54 to be injected. A vent 42 must also be placed in the mold 24, to allow air to escape as the restorative is forced into the space 58 through the access of the ingress hole 40. With the tray off the model, the ingress holes 40 for injection and the vents 42 can be placed using an air rotor drill motor handpiece and a bur preferably a BRASSELER® #849L 009 diamond bur (Savannah, Ga). One injection ingress hole 40 and vent 42 are required for each tooth 12 to be restored. Any dust or debris from the venting procedure is removed with water rinse and compressed air. Molds 24, as shown in FIGS. 8 and 9. The forgoing foundation of wax models and ultimately the molding shells will be repeated for each phase of treatment, namely the dentin layer, an enamel layer and an incisal layer.

Figure 17A:
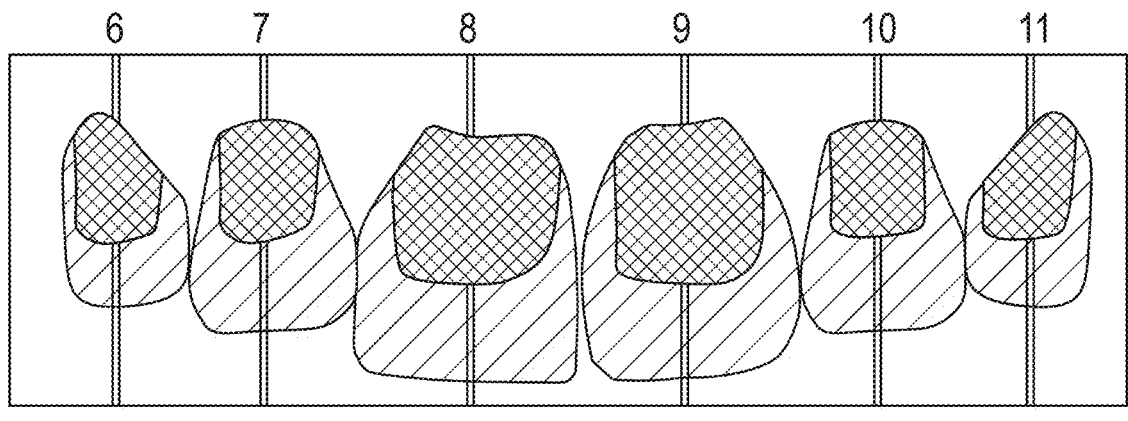
FIG. 17A-17C show three different shells for applying a dentin layer to teeth.
Figure 17B:
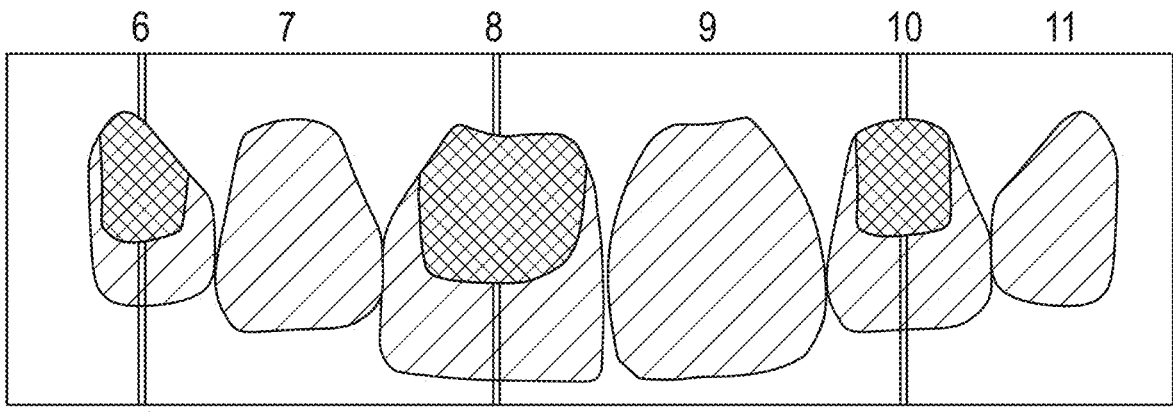
Figure 17C:
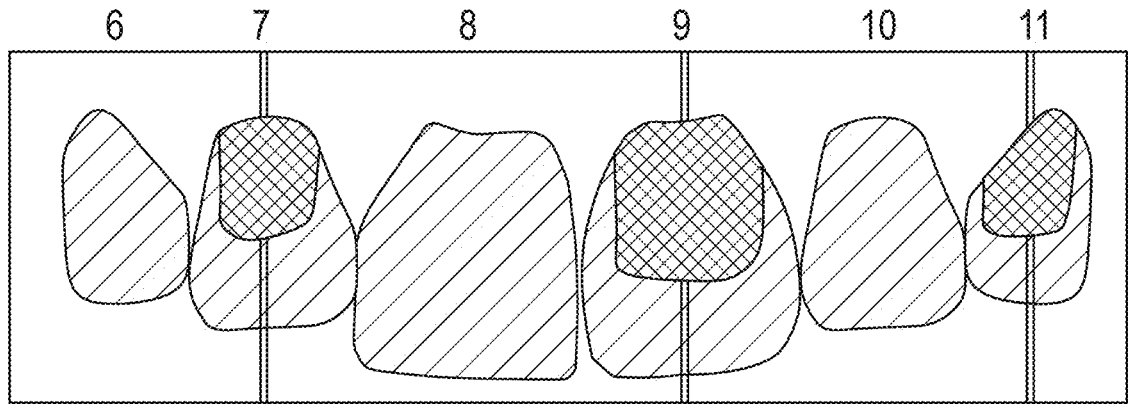
Figure 18A:
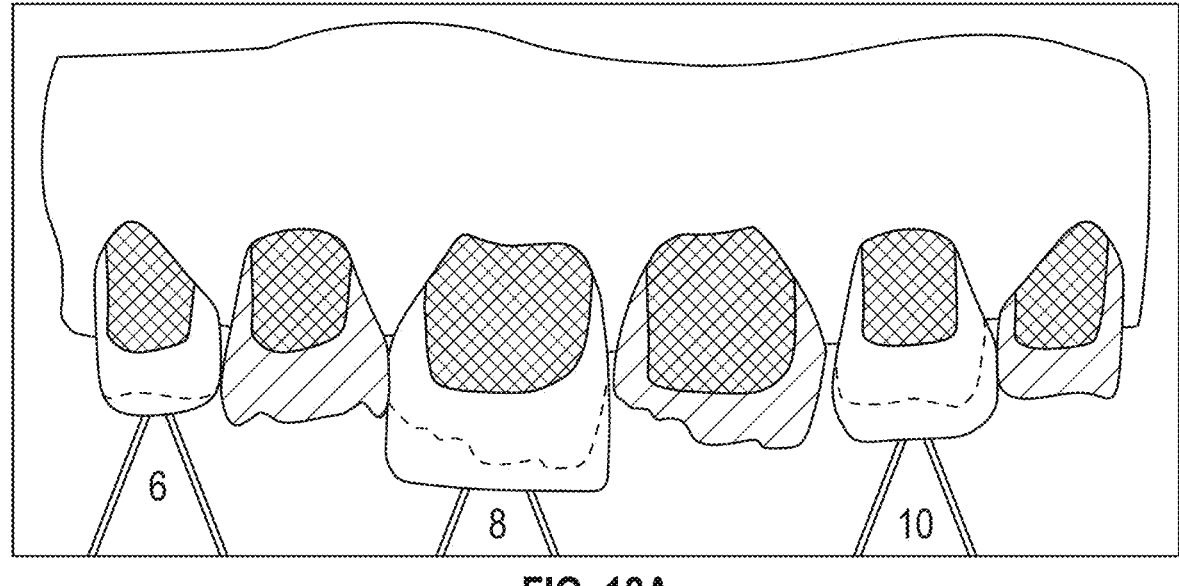
FIGS. 18A and 18B show two separate shells for applying simulated tooth structure for a given layer in alternating fashion.
Figure 18B:
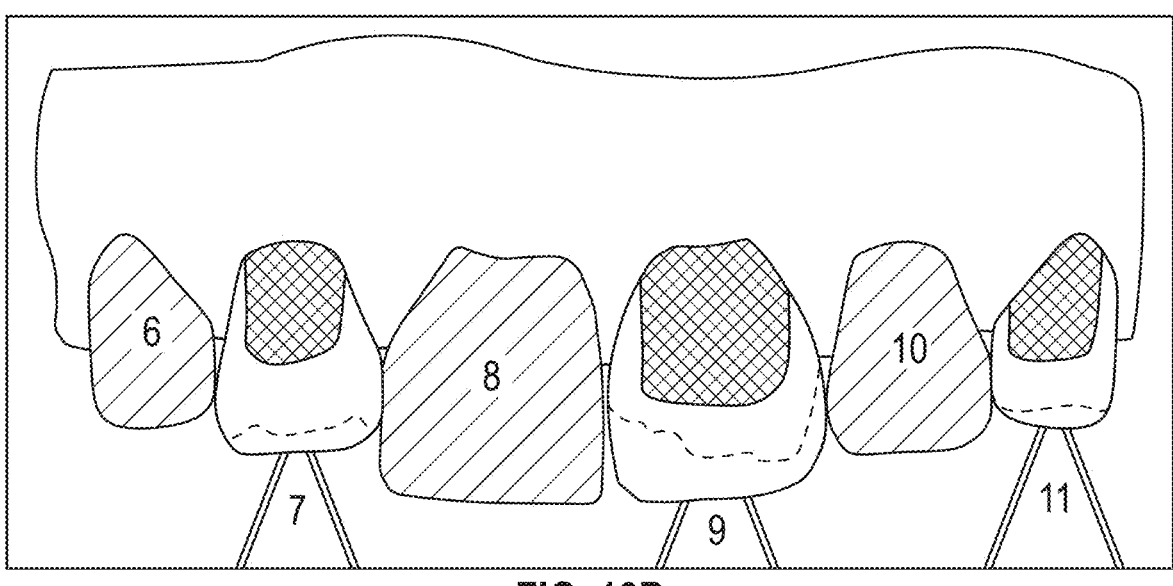

The proposed dentin layer occupies the central portion of each tooth, when viewed from a buccal or facial aspect. From a facial (front) view point healthy human teeth are substantially oval shaped from the gum-line to the bottom edge of the tooth and the outline or silhouette of a tooth equals 100% of the area of that tooth (from a facial view point). The dentin portion of the teeth is an innermost layer and occurs along a central part of covering approximately 65% to 75% depending on the patient. As depicted in FIGS. 17A-17C the substantial oval shape is shown in cross-hatching where the outer-edge of the cross-hatching exemplifies a border where the dentin molding shell seals tightly against the teeth to ensure only that portion of the teeth to be layered with simulated dentin material can be filled with restoration material. The portions of the clear mold that seat tightly against the teeth are referred to herein as "shutoffs" are of crucial importance and shown as "S" they prevent flash or overflow of the dentin restorative material when it is applied to the tooth/teeth under pressure during the dentin restorative phase. Also note that the 65% to 75% space reserved for dentin restoratives is generally raised from 1 to 6 tenths of one millimeter when viewed from a sagittal aspect. The oval and raised space created (either by using dental wax techniques or by using digital modeling technologies) will create a void volume between the teeth and the treatment shell into which the restorative material will be introduced and applied to the tooth/teeth, see FIG. 20A. The dentist may direct the lab to fabricate one dentin layer shell (shell D) so that all of the dentin areas may be restored on the "first pass" (this is most likely for cases where the teeth are straight, or in good alignment to start). In cases with crowding, rotation, and/or overlap, it may be beneficial to restore the dentin layer in alternating passes, for example, restoring every other tooth using two distinct shells with optimal teeth covering or shells skipping only one or two teeth along the arch as appropriate. The concept of using two or more shells to apply a dentin, enamel or incisal layer is depicted in FIGS. 18A and 18B.

Once the dentin layer portions are formed on the model(s), a clear tray is filled with clear polyvinyl material and pressed over the model (poured up stone model or 3D printed model) ensuring that all of the teeth and at least about 1 mm portion of the gingival areas are covered, see FIGS. 17A-17C for example. The shell material is allowed to harden or set for as long as necessary which is often only 3-5 minutes. Once cured/set, the clear tray is removed from the model (if using a stone model with wax, care must be taken so as not to damage the wax). The shell 24 thus produced will be referred to as dentin shell D, shown for example in FIGS. 17A-17C and FIG. 20A. A single pass shell is shown in FIG. 17A. If an alternating tooth method is chosen, the lab tech will then physically remove the wax from every other tooth on a first wax model using an instrument such as PK Thomas ½ Hollenbeck (or digitally remove the dentin masses from every other tooth if 3D modeling). The steps for creating a clear polyvinyl shell described above are repeated, and the resulting clear shells will be referred to as shells D1 and D2. D1 and D2 are shown in FIGS. 17B and 17C respectfully. Appropriate injection ports and vents are then placed in the shells by the tech. The ports and vents are usually placed on the gingival or incisal aspect of the shell (not directly in the facial aspect) for ease of removal of the shells once the composite has been cured by the dentist.

Once the dentin shell(s) have been created, trimmed, and the necessary ports and/or vents have been drilled, milled, or 3D printed, the shells are labeled and set aside for inclusion in the treatment kit.

Next fabrication of the shell for restoration of the final and incisal/facial layers may be created (especially if the composition of stone and wax modeling is used vs. digital modeling). The reason that the final shell(s) is/are created at this time if using stone models with wax build-ups, is that once the final incisal/facial shells has been created, further material will be removed [scraped or carved away using a PK Thomas ½ Hollenbeck instrument, or digitally removed is using a virtual design software] during fabrication of layer enamel shells described in detail below. If models are designed digitally, and then 3D printed, the sequence of fabrication is less critical, because the desired models may be saved and then manipulated as needed regardless of sequence. Heated wax is placed over all of the teeth to be restored, simulating the final, end result/desired outcome. The contours, lengths, outlines and symmetry of the restored teeth are shaped too ideal. Shaping software can be utilized to create the desired end result, one example of the software is art and talent demonstrated by designs such as Smile-BOND Ideal Natural Form™. A clear shell is then created from the final incisal/facial model, see FIG. 20C for example is fabricated using the method(s) described above. As should now be understood, a single shell I may be employed or multiple shells for alternate incisal layer application may be employed. Once formed the shell(s) are set aside to be included in the treatment kit.

Finally, fabrication of the models and shells for restoration of the enamel (or main body) layer will be explained. The simulated enamel layer will nearly always employ the alternating tooth technique to prevent bonding together of adjacent tooth structures. The lab work for the enamel shells is as follows:

A shallow depth [0.2-0.5 mm] well, or broad trough, is cut away from the buccal (facial) surfaces of the final incisal/facial model (which represents the final or desired result) to make room for any desired shadings or tints and the overlying incisal/facial layer. The enamel layer is nominally cut back so the tints and incisal composite may be applied without adding to the overall thickness of the teeth or altering the desired ideal contours.

The cutouts, cutbacks, or wells, occupy the center (approximately 90% volume of the teeth) when observed from a facial viewpoint. When viewed from a sagittal aspect, the wells will be shallow protruding on 0.2-0.5 mm into the tooth structure, allowing for enamel layer composite to substantially cover the dentin layer.

Once wells have been established on all teeth to be restored, a clear shell is created essentially using the method described above regarding the dentin layer. Enamel shells E1 and E2 will be generated to apply simulated enamel in an alternating manner. For the enamel layer an impression or scan should be taken of the enamel model for forming shell E1 because the model will be permanently altered in the next step to make the alternate enamel model to make shell E2. Once the first enamel model, shell and duplicate impression have been created, the enamel model is altered by removing the proposed restorative shapes from every other tooth, creating the second enamel model. Thusly, the first enamel model will display one tooth shaped to ideal, and the adjacent tooth in its original unrestored form, the next in ideal form, and so on. By way of example, for an 8 upper smiling teeth restoration, 4 of the teeth on the model will appear restored to ideal, and 4 will be in original form, in an alternating fashion. Prior to fabricating the clear shell E2, the lab must place a volume of wax (or digitally manipulate the model) sufficient to block out the dentin area which was already applied on the teeth not being restored on the first pass. This allows for maintenance of the shut off areas to ensure a tight fit over the dentin restored areas. A clear shell is fabricated from each of the enamel models, and ports and vents are placed as described and shown in FIGS. 18A and 18B for example.

Shells for E1 and E2 are set aside to be included in the restorative kit.

When shell E1 is used to restore the enamel layer for the first 4 alternating teeth, the clear polyvinyl shell will have a void volume over the first 4 teeth altered to ideal and will fit tightly against the alternating teeth left in original form. The tight fit will act as a shutoff, preventing flow of the restorative composite into the adjacent teeth areas. Placing a barrier such as teflon tape, or glycerin, or thin metal foil over the teeth that have been shut-off will ensure efficient and minimal finishing procedures for the first pass teeth once the shell is removed and prevent bonding together of the adjacent teeth. Likewise, the shell E2 will include void volumes for the teeth in need of a simulated enamel layer and will include shut off portions. This tight-fitting shell with the shut-off surface areas differs from previous injection bonding techniques such as those disclosed in the current inventors' previous patents and saves valuable time and for preventing overflow or flashing.

Figure 10:
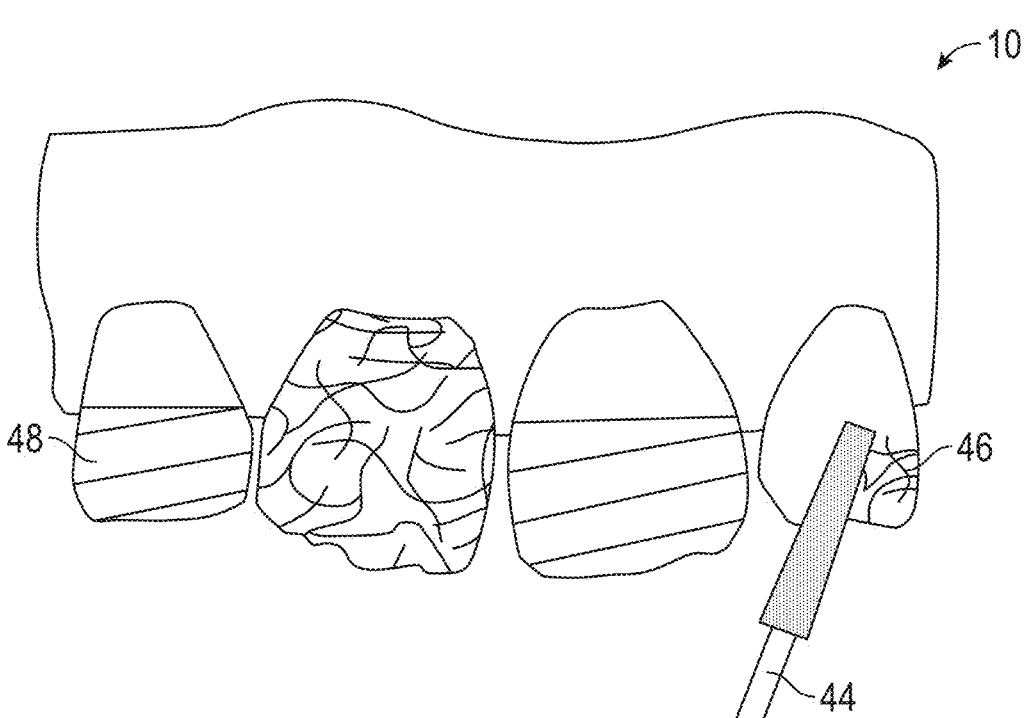
FIG. 10 shows preparation of the patient's teeth 10 by roughening the teeth with a fine diamond bur 44 and covering the teeth with a polymer release material 48.

Once the series of treatment shells are formed to the desired treatment specifications, the shells are provided to the dental professional to begin restoration process.
Treatment Procedures Once the kit is completed and on hand at the treatment facility such as a dental office, the patient is appointed for treatment. The desired outcome and treatment goals are once again reviewed with the patient. In most cases anesthetic is not needed, but if required some is given before starting work. In most cases, tooth reduction (tooth prepping) is not needed, but for cases with overlapping and/or crowding/ rotations, some may be needed and in more egregious cases a preparation guide as described previously may be useful. As should be appreciated nominal tooth roughing or grinding can be carried out without impacting the final results for the initial step because the shell void is what controls the result. This would now be completed before starting work with the bonding shells. A prep guide provided by the lab should be used, to ensure the teeth are modified to ensure proper fit of the "shut-off" areas in the custom bonding shells. After prepping using the prep guide (or light surface roughening with a fine diamond bur if deeper prepping is not required), as shown in FIG. 10 for example the surfaces are rinsed, cleansed with chlorhexidine 2%, rinsed and dried.

Figure 11:
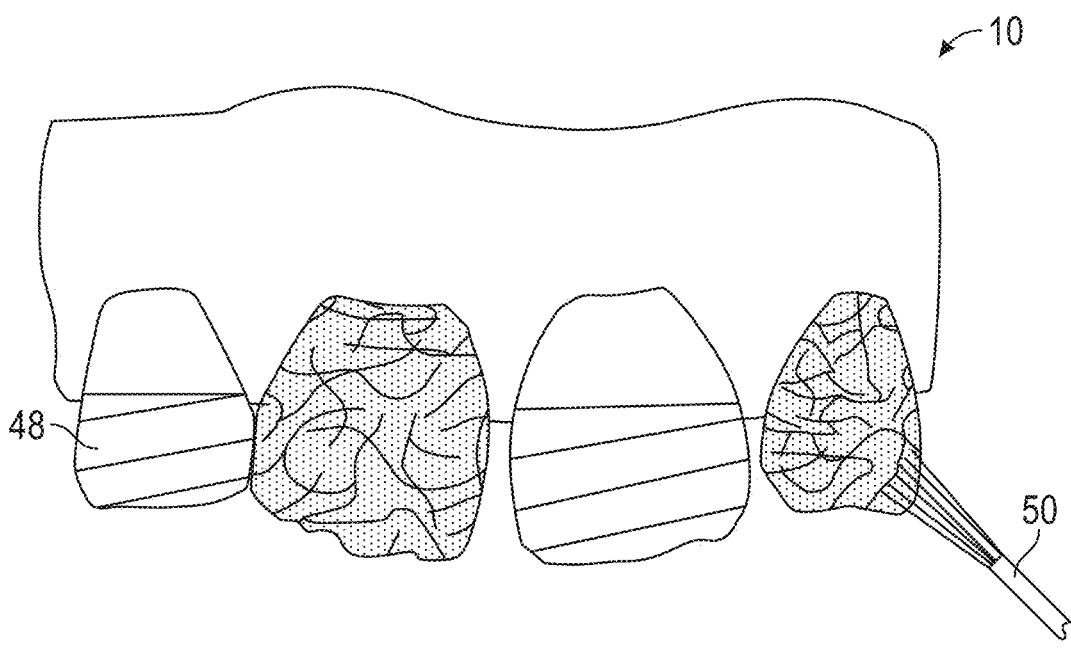
FIG. 11 shows application of a bonding resin primer after teeth have been etched.
Figure 12:
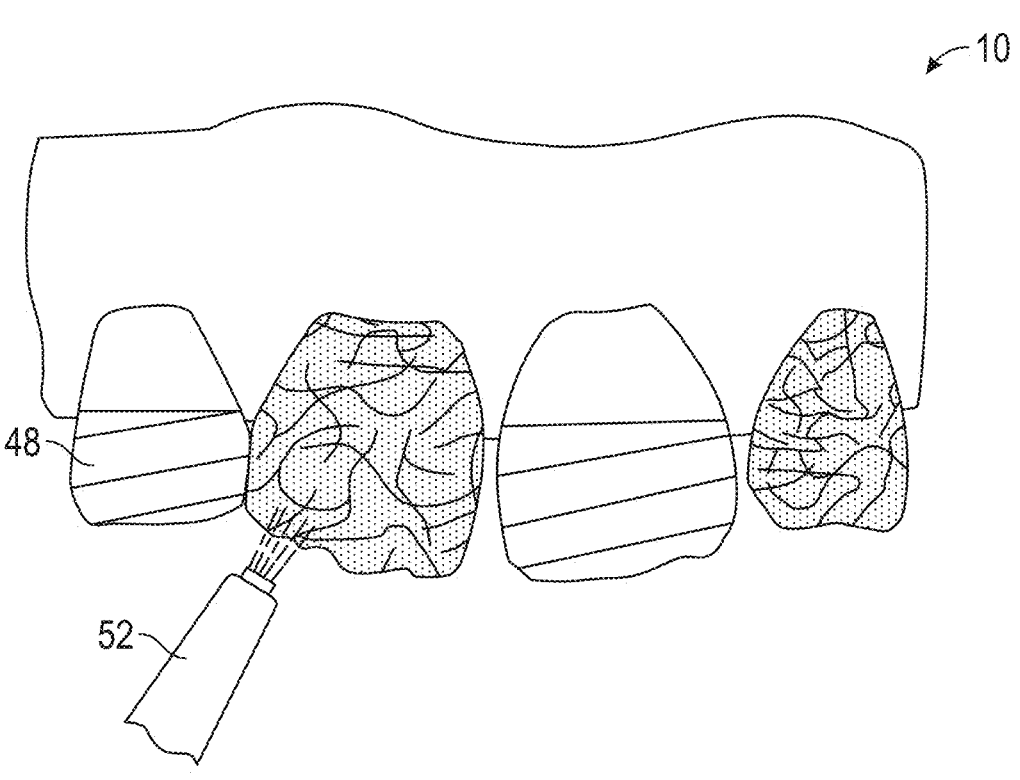
FIG. 12 shows light curing of a bonding agent applied after the bonding resin primer.
Figure 13:
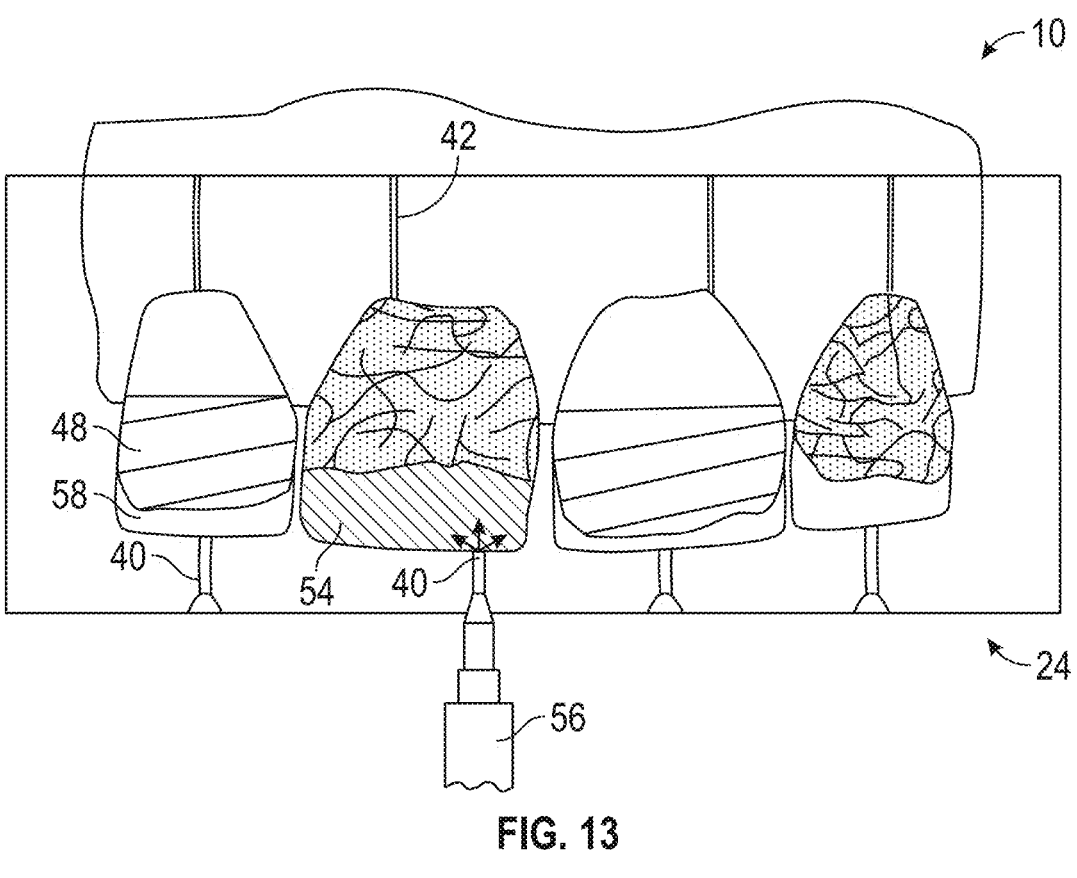
FIG. 13 shows injection of the flowable composite resin 54 with a syringe 56 having a narrow tip.

As noted above the first step of the restorative process is to apply the dentin layer. At the discretion of the dentist either all dentin areas may be restored at once, or the "alternating pass" method may be employed. If all are restored at once, a single dentin shell will be used. If so, the central buccal portions of the teeth (shown in cross-hatching in FIG. 17) are etched for approximately 30 seconds with a suitable composition such as phosphoric acid gel. The gel is rinsed and dried, leaving an etched surface with a "frosty" appearance. Bonding agent is applied to the etched areas, as shown in FIG. 11, blotted with cotton and dispersed evenly with a gentle blast of air from an air syringe, then cured for 20 seconds with a uv curing light as shown in FIG. 12. The dentin bonding shell, such as that shown in cross-section in FIG. 20A is placed over the teeth, and a dentin restorative composite is injected into the void volumes in the shell until full. Because the shells are clear polyvinyl or printed or milled plastic, the dentist can easily observe when the fill is complete. The dentin composite is then cured through the shell and the shell is removed. If the alternating tooth method is used, only the first pass teeth are etched and primed for bonding. The $2^{nd}$ pass teeth are covered with a barrier such as teflon tape. The tape may be coated with a thin film of glycerin which helps with the tape's removal when bonding is completed. Once the tape is in place, the bonding agent is cured, and the first dentin shell (D1) is placed over the teeth. Dentin composite is injected into the void volumes of shell D1 and cured (the shutoff areas in the shell covering teeth to be bonded in the next pass prevent flash or overflow of material into the adjacent tooth spaces). Dentin shell D1 is removed, the teflon tape is removed, and any minor areas of flash are removed. Next, the $2^{nd}$ pass teeth are etched, and bonding agent applied. The first pass teeth are covered with teflon tape and glycerin, and the bonding agent cured. Dentin shell D2 is placed, and the $2^{nd}$ pass teeth are restored and cared in the same manner described above. Shell D2 is removed, and the dentin layer procedure is now complete.

The next step is restoration of the enamel layer. As an alternating method is almost always used, care is taken to ensure that all interproximal areas may be flossed, so that teflon tape may easily be used as a barrier. The first pass teeth are re-etched, rinsed and dried. Bonding agent is carefully applied to the etched areas using a brush (the bonding agent is not cured until the teflon barriers are placed) teflon tape is placed over the $2^{nd}$ pass teeth. The enamel shell E1 is placed over the teeth, and enamel composite restorative material is applied into the void volumes and cured. Enamel shell E1 is removed, the teflon barriers are removed, and minor flash areas are removed and polished. The shutoff areas covering teeth to be restored in the $2^{nd}$ pass in enamel shell E1 effectively prevent flash or overflow of material into the $2^{nd}$ pass spaces. The $2^{nd}$ pass teeth are etched and bonding agent applied as described, the $1^{st}$ pass teeth are isolated with teflon as described, enamel shell E2 is placed and the $2^{nd}$ pass teeth are restored and cured as described.

Finally, the incisal/facial layer is placed to complete the multilayer restoration. While the term "incisal" may be understood as regarding an incisor tooth it should be understood that the layer means the outermost layer of a treated tooth. Since the tints and facial composite is being placed in cutouts or wells prefabricated in the enamel layer, no further etching is required (as long as the final layer is applied immediately after the enamel layer has been completed, and sufficient camforquinone photo initiators are present to ensure effective bonding. Tints are placed in the well or cut out areas as desired using a thin sable brush. Pink or orange tints may be used to simulate natural vital structures in teeth such as blood vessel and nerve tissues present in pulp chambers. Blue, grey and/or purple tints may be used to simulate transparency or translucency of natural tooth structure. The darker colors are usually placed along the outer borders or outlines of the teeth, which creates an outline of darker translucency, and a lighter outer edge or "halo" commonly seen in natural dentition. Once the desired tints have been laid down, the incisal/facial shell(s) are used to apply the final facial layer of restorative composite as described. Once cured, the shell is removed, and final finishing/polishing procedures are completed.

Figure 14:
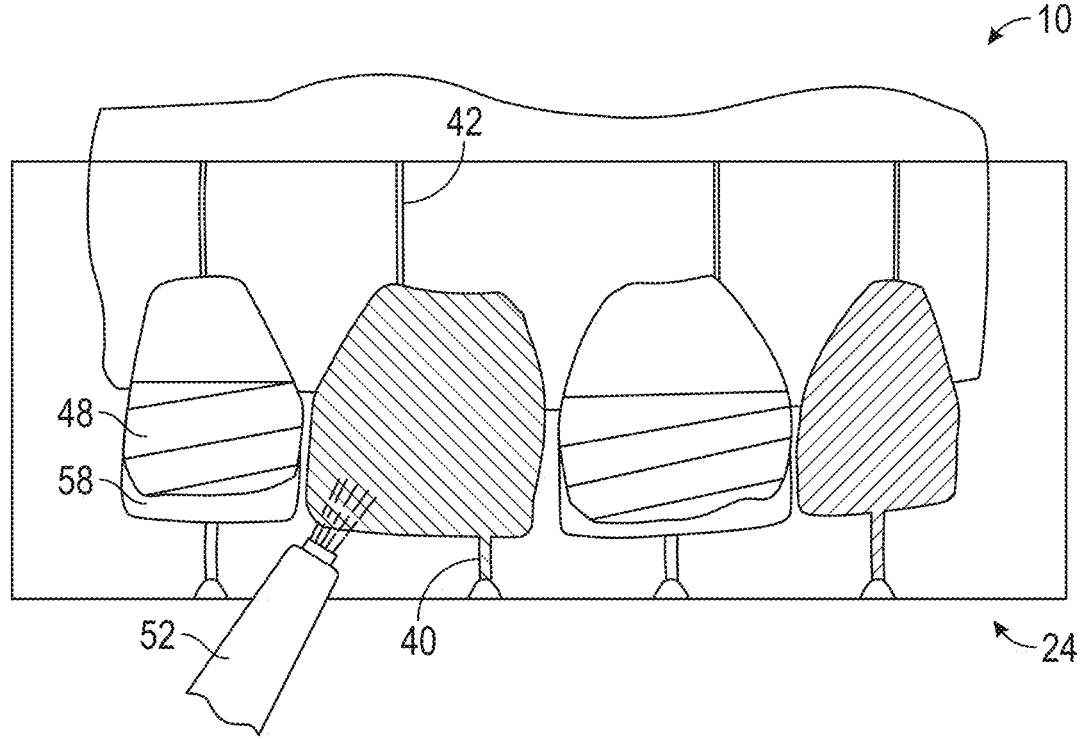
FIG. 14 shows curing of the flowable composite resin using a curing light 52.
Figure 15:
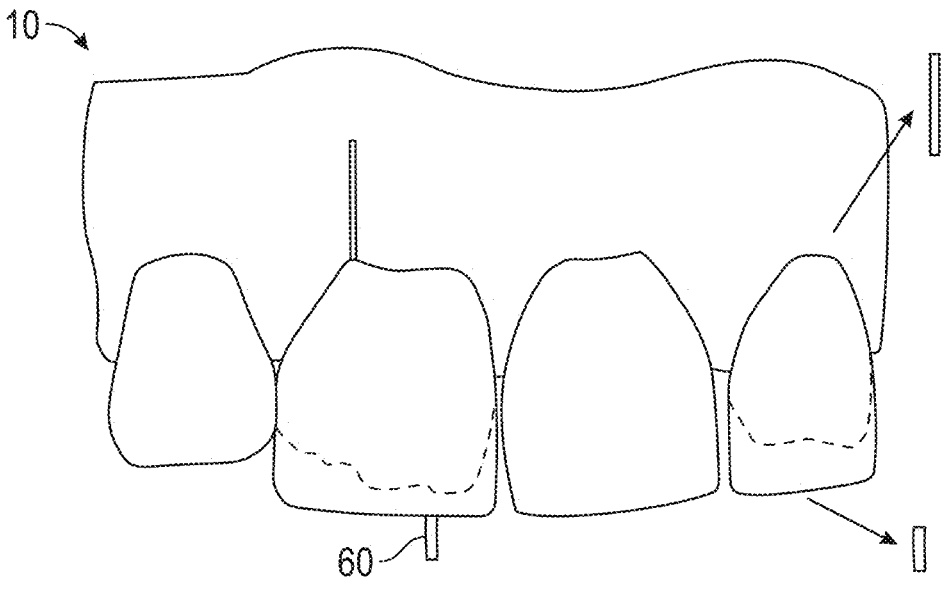
FIG. 15 shows removal of the tray and mold 24, polymer release material 48, and excess resin 60 prior to Smoothing and polishing the restored teeth 10.

It is preferable to use a flowable composite resin 54 as the "restoration material" to restore teeth according to the method described. Many such materials are available for use. Some examples of composite resins are described in U.S. Pat. No. 6,479,592 to Rheinberger et al., U.S. Patent Application Publication No. 2004/0167246 to Subelka et al., and U.S. Patent Application Publication No. 2003/0069326 to Stangel et al. hereby incorporated herein by reference in their entirety. One preferred material is HELIOMOLAR® Flow composite (Ivoclar Vivadent, Amherst, N.Y.). The diameter of the tubing closely approximates the diameter of a BRASSELER® #849L 009 diamond bur which can be used to make the injection ingress holes 40 in the various treatment molds, e.g. D, E and I series. The syringe 56 tip is placed in a ingress hole 40 directly over a tooth 12 not covered by with polymer release material 48. The composite resin 54 is flowed, or injected by pushing on the plunger with the thumb. The dentist can monitor the progress of the composite resin 54 flow, and stop applying pressure when the composite resin 54 begins to escape from the vent 42. After injection, cure or hardening the resin with electromagnetic energy such as light emitted from a curing light 52 (465-480 nm) for approximately thirty seconds as shown in FIG. 14.

Figure 16:
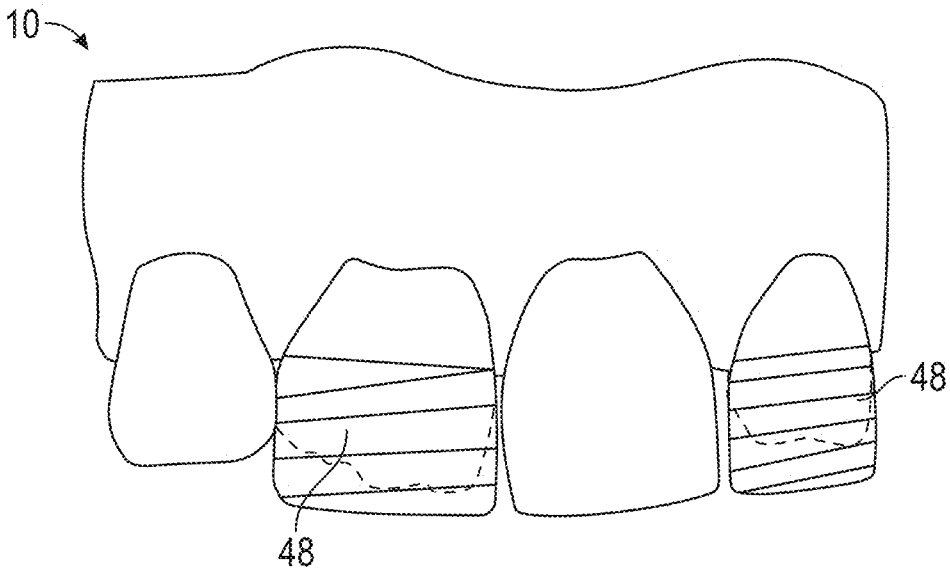
FIG. 16 shows the restored teeth 10 wrapped polymer release material 48 in preparation for a second round of restoration.

While the shell molds of the present invention are specifically designed to include shut-offs to limit the amount of material which may seep out adjacent teeth some amount of flashing (excess material) will occur. It should be understood that any flashing such as that shown in FIG. 15 should be removed. FIG. 16 shows teeth wrapped polymer release material 48 in preparation for a treatment round e.g. a first or second pass employing a first or second shells respectively.

In further support of the above described method, FIG. 17 is provided to demonstrate only that portion of the teeth will be covered with simulated dentin materials as described above. FIG. 18A demonstrates shell E1 for a first pass application of an enamel layer over at least a portion of a previously applied dentin layer. As should be understood, the dentin layer would not be clearly visible once the enamel layer is applied but is included herein and depicted with cross-hatching for purposes of explanation, likewise, FIG. 18B shows a second pass enamel shell E2 for applying a simulated enamel layer over the untreated teeth from the first pass. FIG. 19 shows a cross-section of an exemplary tooth structure after treatment employing the method described herein. As such, the underlying tooth structure T is shown having a dentin layer D applied thereto; an enamel layer E applied over the dentin layer (and in this instance a portion of the tooth structure extending beyond the dentin layer); and an incisal layer I applied over at least a portion (generally the visible portion) of the enamel layer.

FIGS. 20A-20C show cross-sections of the clear molds employed. For example, FIG. 20A shows a dentin mold D for application of the dentin layer 60 over the underlying tooth structure T. FIG. 20B shows an enamel mold E for application of an enamel layer 62 over at least a portion of the dentin layer 60. FIG. 20C shows an incisal layer applied over at least a portion of the enamel layer 62.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A multi-layer multi-mold method for restoring teeth comprising the steps of:
   (a) preparing one or more teeth to be restored;

(b) optionally covering teeth which are not to be restored in a first pass with a release material;
   (c) fitting a thermoplastic mold over the one or more prepared teeth to be restored, said mold having a portion which seats against a tooth and seals off the one or more teeth to be restored and a void volume for receiving a fluid restoration composition which defines a first shape of partially restored teeth;
   (d) applying a restoration composition via the thermoplastic mold of step (c) into the void volume to apply a first layer of restoration material to the one or more teeth;
   (e) curing the fluid restoration composition onto the one or more teeth to be restored to provide a simulated dentin layer;
   (f) providing a second thermoplastic mold and repeating steps (a)-(e) to provide a simulated enamel layer over at least a portion of the dentin layer; and
   (g) providing a third thermoplastic mold and repeating steps (a)-(e) to apply incisal layer over at least a portion of the enamel layer to provide a simulated incisal layer.

2. The multilayer multi-mold method of claim 1 comprising the further step of:
   (a1) which occurs after step (e) but before step (f), said step (a1) including removing the release material if present and preparing one or more teeth not restored in step (c);
   (b1) optionally covering one or more teeth treated in steps (a)-(e);
   (c1) fitting a thermoplastic mold over one or more teeth not restored in step (c), said mold having a portion which seats against a tooth and seals off the one or more teeth to be restored and a void volume for receiving a fluid restoration composition which defines a first shape of partially restored teeth;
   (d1) applying a restoration composition via the thermoplastic mold of step (c1) to apply a first layer of restoration material to the selected one or more teeth;
   (e1) curing the fluid restoration composition onto the one or more teeth to be restored to provide a simulated dentin layer;
   (f1) after step (f) but before step (g) removing the release material if present and preparing one or more teeth not restored in step (c); and repeating steps (b1)-(e1) to provide a simulated enamel layer over at least a portion of the simulated dentin layer; and
   (g1) after step (g) removing the release material if present and preparing one or more teeth not restored in step (c) and repeating steps (b1)-(e1) to provide a simulated incisal layer over at least a portion of the simulated enamel layer.

3. The method of claim 2 wherein the release material is a PTFE tape; a glycerin, vegetable oil, and argon oil.

4. The method of claim 1 wherein the thermoplastic mold comprises a plurality of clear plastic trays each of which is derived from prepared models of the teeth as they will be restored in the patient in a multilayer sequence.

5. The method of claim 4 wherein a dental cast is prepared from an impression of the teeth to be restored, then a dental stone model is prepared, and then the stone model is modified to simulate the restored teeth in a stepwise multilayer manner to form a plurality of molds.

6. The method of claim 5 wherein the dental stone model is modified with a wax shaped to simulate one layer to of the restored teeth.

7. The method of claim 1 wherein the fluid polymer composition is cured with light.

8. The method of claim 7 wherein the fluid polymer composition is cured with ultraviolet light of about 465 nm to about 480 nm.

9. The method of claim 1 wherein the dental restoration composition is a particle filled and pigmented poly (acrylic acid) polymer containing a curing agent activated by light.

10. The method of claim 1 wherein in step (a) the one or more prepared teeth are etched with an acid and then coated with a primer and bonding agent for bonding the fluid restoration composition to the prepared teeth.

11. The method of claim 2 wherein in step (a1) the one or more prepared teeth are etched with an acid and then coated with a primer and bonding agent for bonding the fluid restoration composition to the prepared teeth.

12. The method of claim 10 wherein the bonding agent comprises methacrylate ester monomers and the primer comprises alkyl dimethacrylate resins.

13. The method of claim 11 wherein the bonding agent comprises methacrylate ester monomers and the primer comprises alkyl dimethacrylate resins.

14. The method of claim 1 wherein the thermoplastic mold has an inlet port for injection of restoration composition and an outlet port for removing any excess restoration composition.

15. The method of claim 2 wherein the thermoplastic mold has an inlet port for injection of restoration composition and an outlet port for removing any excess restoration composition.

16. The method of claim 1 wherein the thermoplastic molds used are formed by:

(a) scanning an existing dental structure to generate a three dimensional first digital model of the existing dental structure;

(b) modifying the first digital model of the existing dental structure to generate a three-dimensional second digital model of a planned dental structure, the planned dental structure having spatial surface contours different from those of the existing dental structure; and (c) generating a three-dimensional third digital model corresponding to a negative of the second digital model, wherein (i) the third digital model comprises a volume corresponding to walls of the dental mold, corresponding to the planned dental structure.

17. The method of claim 2 wherein the thermoplastic molds used are formed by:

(a) scanning an existing dental structure to generate a three dimensional first digital model of the existing dental structure;

(b) modifying the first digital model of the existing dental structure to generate a three-dimensional second digital model of a planned dental structure, the planned dental structure having spatial surface contours different from those of the existing dental structure; and (c) generating a three-dimensional third digital model corresponding to a negative of the second digital model, wherein (i) the third digital model comprises a volume corresponding to walls of the dental mold, corresponding to the planned dental structure.

\* \* \* \* \*